United States Patent
Fielding

(10) Patent No.: US 8,159,555 B2
(45) Date of Patent: Apr. 17, 2012

(54) METHOD FOR INFRARED IMAGE CORRECTION AND ENHANCEMENT

(75) Inventor: Gabriel Fielding, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1251 days.

(21) Appl. No.: 11/854,609

(22) Filed: Sep. 13, 2007

(65) Prior Publication Data

US 2009/0073262 A1    Mar. 19, 2009

(51) Int. Cl.
*G06K 9/00* (2006.01)
(52) U.S. Cl. ...................... 348/223.1; 358/1.9
(58) Field of Classification Search .............. 348/223.1; 250/330; 358/1.9; 382/163
See application file for complete search history.

(56) References Cited

U.S. PATENT DOCUMENTS

| | | | |
|---|---|---|---|
| 4,680,638 A | 7/1987 | Childs | |
| 5,255,083 A | 10/1993 | Capitant et al. | |
| 5,266,805 A * | 11/1993 | Edgar | 250/330 |
| 5,673,336 A | 9/1997 | Edgar et al. | |
| 6,134,339 A * | 10/2000 | Luo | 382/115 |
| 7,133,070 B2 * | 11/2006 | Wheeler et al. | 348/223.1 |
| 7,218,795 B2 * | 5/2007 | Trifonov et al. | 382/279 |
| 7,860,306 B2 * | 12/2010 | Mallick et al. | 382/163 |
| 7,889,390 B2 * | 2/2011 | Wang | 358/1.9 |
| 2009/0073262 A1 * | 3/2009 | Fielding | 348/97 |
| 2010/0111489 A1 * | 5/2010 | Presler | 386/52 |
| 2011/0142366 A1 * | 6/2011 | Young | 382/274 |

* cited by examiner

*Primary Examiner* — Khanh Dinh
(74) *Attorney, Agent, or Firm* — Kevin E. Spaulding

(57) ABSTRACT

A method for correcting defects in one or more frames of motion picture film, the method includes the steps of generating an image that includes an infrared channel and one or more color channels; providing an infrared unbuilding model that includes at least one non-linear component that accounts for cross-talk between the one or more color channels and the infrared channel; providing one or more parameters for the infrared unbuilding model; and applying the infrared unbuilding model parameters to the infrared unbuilding model to remove cross-talk between the one or more color channels and the infrared channel to generate an independent infrared channel that is free or substantially free of color channel content.

7 Claims, 6 Drawing Sheets

$$I_{ideal} = I_{measured} + $$
$$L_R * R + L_{R2} * R^2 + L_{RG} * R * G + $$
$$L_G * G + L_{G2} * G^2 + L_{GB} * G * B + $$
$$L_B * B + L_{B2} * B^2 + L_{RB} * R * B + $$

FIG. 3

METHOD FOR INFRARED IMAGE CORRECTION AND ENHANCEMENT

FIELD OF THE INVENTION

The present invention relates to the field of restoration of scanned motion picture film and image processing.

BACKGROUND OF THE INVENTION

In U.S. Pat. No. 4,680,638, a method is taught for concealing defects in film by using an infrared signal with a video signal to control the substitution of information from other parts of the film in those defect regions. This patent notes that "cyan film dye has a slight effect on transmission of infra-red radiation" and that some "masking" is thus required. There is no detailed description of this masking process and no film model is used in relation to the defect detection process. The process described therein may produce infrared channels with some residual cross-channel interference from the other color records in the film. This will subsequently reduce the effectiveness of the detection and correction process. For this reason, a means of overcoming this limitation was desired.

In U.S. Pat. No. 5,266,805, a method is taught for compensating for defects on film recording media via the use of an infrared channel. The correction of obscured pixels is obtained using information contained in the frame of one image. The correction method allows for defects, such as dust and scratches, to be removed through the judicious application of spatial image processing of the image data. This patent discloses that crossover in the scanned red color record may be removed via linear algebraic methods (col. 11, lines 44-65). This method is an effective yet somewhat simplistic means of removing unwanted interactions between the dyes during the scanning process. Higher-order interactions and non-linear responses may occur during the film-development process resulting in image content being present in the detected infrared channel. And a non-iterative approach to solving for the cross-correlation can be sensitive to outliers. Because of the importance of obtaining a statistically independent infrared channel, alternative improved methods of decorrelating the input channels (red, green, blue infrared) are sought. Virtually all scanned film defect detection/correction methods require a high quality infrared channel in order to provide high quality detection/correction. So while the presently known method of decorrelation is often satisfactory for some film scans, improvements to the decorrelation process will yield much better detection of defects.

SUMMARY OF THE INVENTION

The present invention provides a method for using the input channels obtained from scanning film to provide a corrected independent infrared channel that is suitable for subsequent post-processing. U.S. Pat. No. 5,266,805 teaches the use of linear algebraic methods to remove inter-channel interactions from the infrared channel to allow for optimal dust/dirt detection. Higher-order models and non-linear estimation methods can produce much more robust estimates of the independent infrared channel. Building such a model requires knowledge of the interactions between the color records in the physical film medium as well as knowledge of robust estimation methods. Appropriate non-linear models that adequately describe film behaviors include for example piecewise linear models with more than one line segment, spline models, lookup table-based models, and polynomial models. By describing a method for improved estimation of the independent infrared channel, subsequent processing intended for detection and correction of defects in the scan of the physical film media will be greatly improved. Given knowledge of the film stock being scanned, one may provide the appropriate model parameters to facilitate the decorrelation process. The parameters may also be provided by an estimation algorithm that performs the estimation on the image data directly. Finally, the estimation algorithm may be iterative in nature such that the parameters produced at the final iteration are far more accurate and reliable.

In one implementation of the present invention, a film model accounting for linear and nonlinear inter-channel correlation between the color records and the infrared channel is used to provide for an improved infrared channel.

In another implementation of the present invention, a film model accounting for inter-channel correlation between the color records and the infrared channel is used to provide for an improved infrared channel and the coefficients of that model are provided based on knowledge of the film stock being scanned.

In another implementation of the present invention, a film model accounting for inter-channel correlation between the color records and the infrared channel is used; however, the coefficients of the model are estimated from the scanned image data.

In another implementation of the present invention, a film model accounting for inter-channel correlation between the color records and the infrared channel is used. However the coefficients of the model are first estimated from the scanned image data and then they are compared to a library of model parameters for known film stocks and then the closest set of parameters for an existing film stock is used.

In another implementation of the present invention, the parametric estimation step, whether using a linear, piecewise linear, polynomial, spline, lookup table-based model, or other sophisticated models, is used iteratively such that at least one pixel from the one or more color channels is excluded in each subsequent iteration during the estimation step.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The invention will be described with reference to the accompanying figures, in which:

FIG. 3 shows one embodiment for the model for accounting for interactions between the infrared channel and the visible color records in the film;

DETAILED DESCRIPTION OF THE INVENTION

Figure 1:
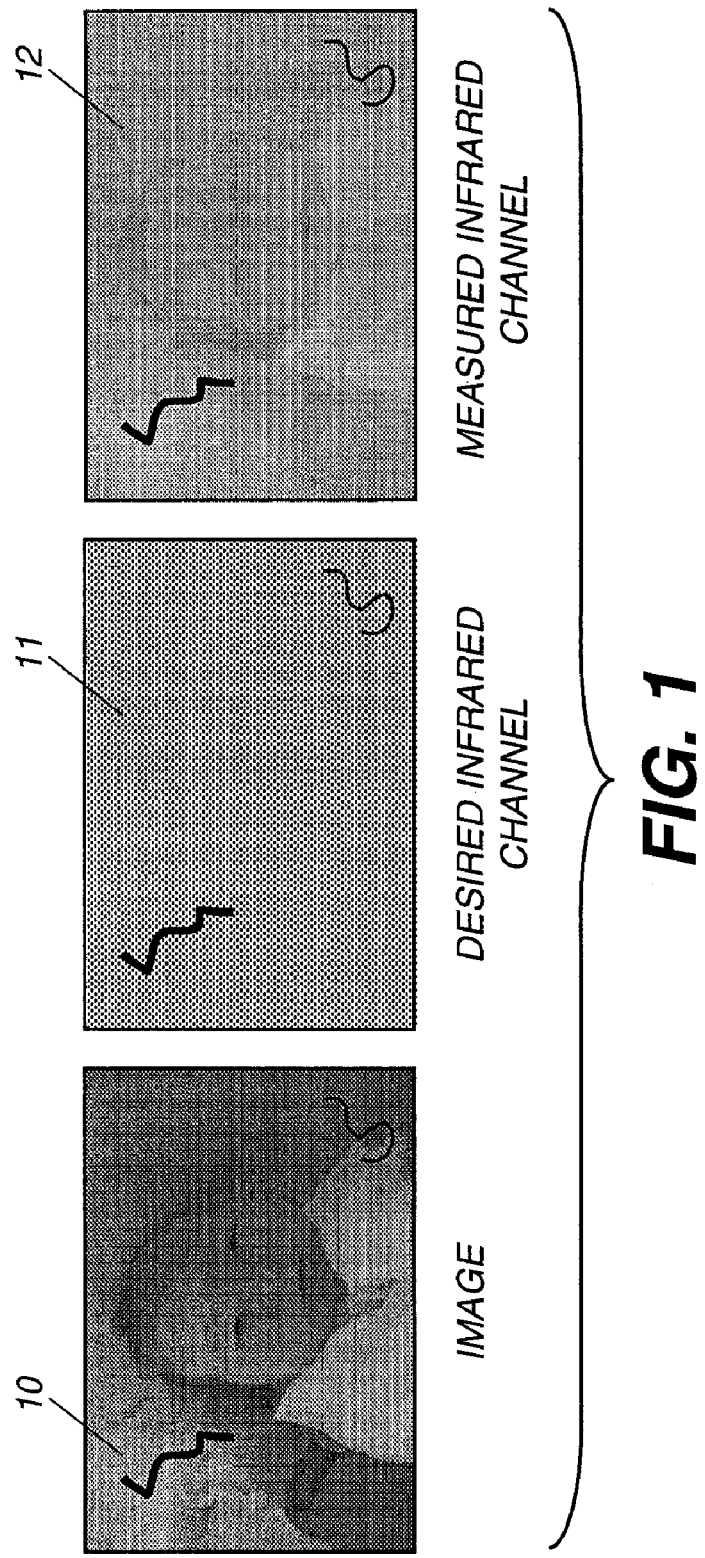
FIG. 1 illustrates an image with its desired infrared channel and its measured infrared channel.

FIG. 1 illustrates the premise of the present invention disclosed herein. Common defects such as dirt, scratches, or hairs 10 may appear in a given frame in a sequence of images. Under ideal conditions these defects would appear in the infrared channel 11 such that the underlying image content is no longer present. However, there is an inevitable leakage of image content into the actual infrared channel which is often seen as a "ghost" of the image data 12 along with the defects. The present invention aims to eliminate the cross-correlation of the image content seen in the captured infrared channel 12 and produce a more ideal infrared channel 11.

Figure 2:
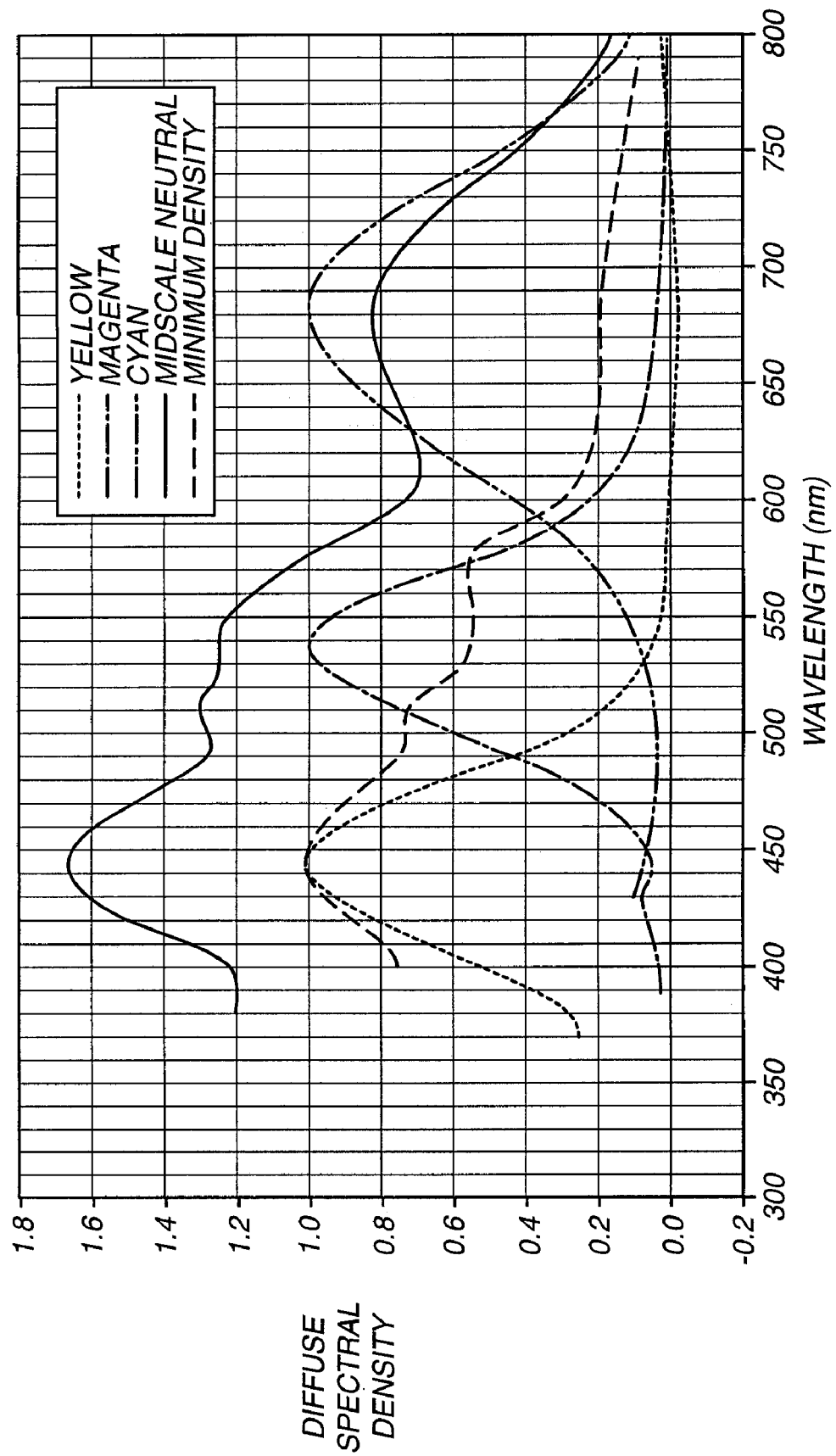
FIG. 2 shows the spectral dye densities for a film stock wherein it can be seen that the dyes have overlapping responses with each other and that the spectral responses extend well into the infrared range.

FIG. 2 shows the spectral dye densities for a representative film stock. Because the dyes have overlapping spectral responses and because the spectral responses extend well into the infrared range, it will be necessary to account for inter-channel correlations when estimating the ideal independent infrared channel.

FIG. 3 shows an example of a model that accounts for higher-order interactions between the infrared channel and the visible color records in the film. The infrared channel is denoted by the symbol I, and the visible color records in the film are denoted by the terms R, G, and B. The model parameters are denoted by the symbol L with a subscript indicating which model term the parameter is associated with. In this model, there are nine parameters that describe the system. In this specific model, it can be seen that there are linear terms included ($L_R$, $L_G$, and $L_B$) as well as higher-order (non-linear) terms ($L_{RG}$, $L_{RB}$, $L_{GB}$, $L_{R2}$, $L_{G2}$, $L_{B2}$). Correction of the infrared channel with these higher-order terms can provide substantially improved estimates of the ideal independent infrared channel.

The unbuilding model may be provided by either a piecewise linear model with at least two segments, a lookup table, a polynomial, or a predetermined set of parameters for a particular film stock.

The parameters of the unbuilding model are estimated by analyzing the one or more color channels and the infrared channel. For example, one may use regression to determine the parameters for the infrared unbuilding model.

Additionally, the parametric estimation may be improved with an iterative process in which at least one pixel from the one or more color channels is excluded in a subsequent iteration. This type of robust estimation procedure allows the final estimated parameters to be less affected by noise and outliers in the original data. This iterative procedure can be applied to the linear model described in U.S. Pat. No. 5,266,805 or to any of the more sophisticated models described in this invention.

Figure 4:
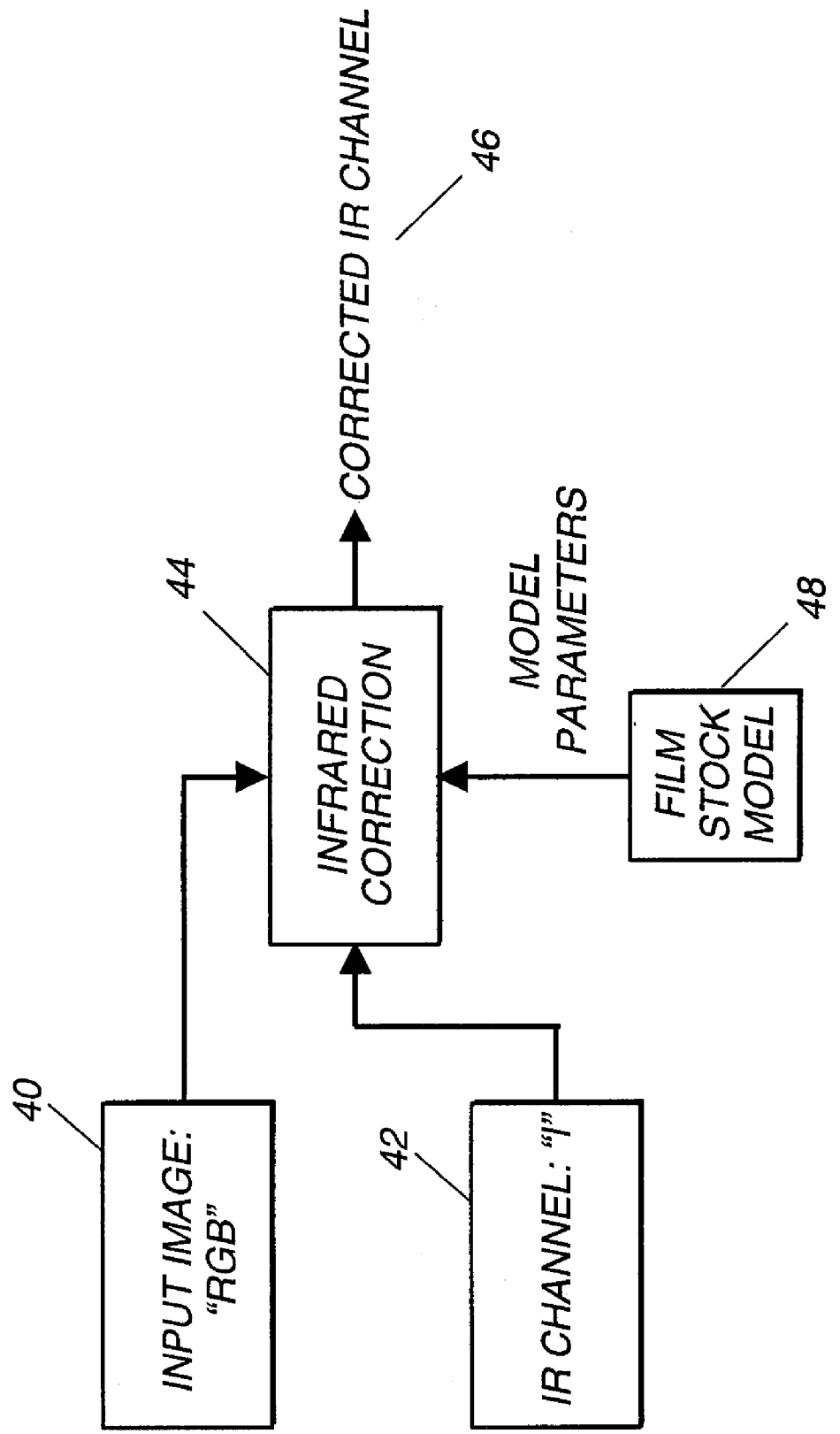
FIG. 4 shows a block diagram of a general arrangement for an embodiment of the invention, which operates on an image sequence using a specified film model and produces a corrected infrared channel.

FIG. 4 shows a block diagram of an embodiment of the present invention. Images from a film scanner enabled with an infrared light source can provide RGB image data 40 as well as an infrared channel 42. By providing model parameters 48, a model such as the one shown in FIG. 3 may be used in 44 to correct the infrared channel 46. This correction may be used in subsequent post-processing.

Figure 5:
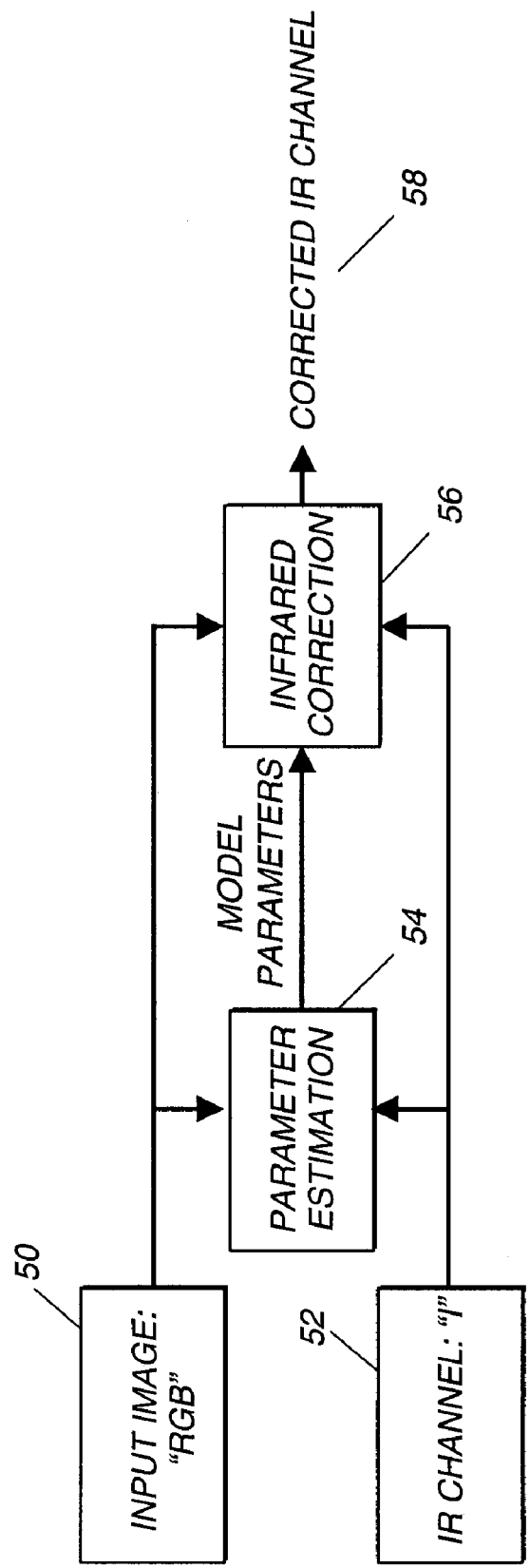
FIG. 5 shows a block diagram of a general arrangement for an embodiment of the present invention, which operates on an image sequence by first estimating the model parameters from the infrared and visible color records and subsequently producing a corrected infrared channel using those estimated parameters.

FIG. 5 shows a block diagram of another embodiment of the invention. Images from a film scanner enabled with an infrared light source provide RGB image data 50 as well as an infrared channel 52. Here, the model parameters are estimated 54 from the scanned data directly and used to correct 56 the infrared channel and provide a corrected infrared channel 58. If the parametric estimation step is to be performed iteratively, this can occur at the point of the estimation 54 prior to correction.

Figure 6:
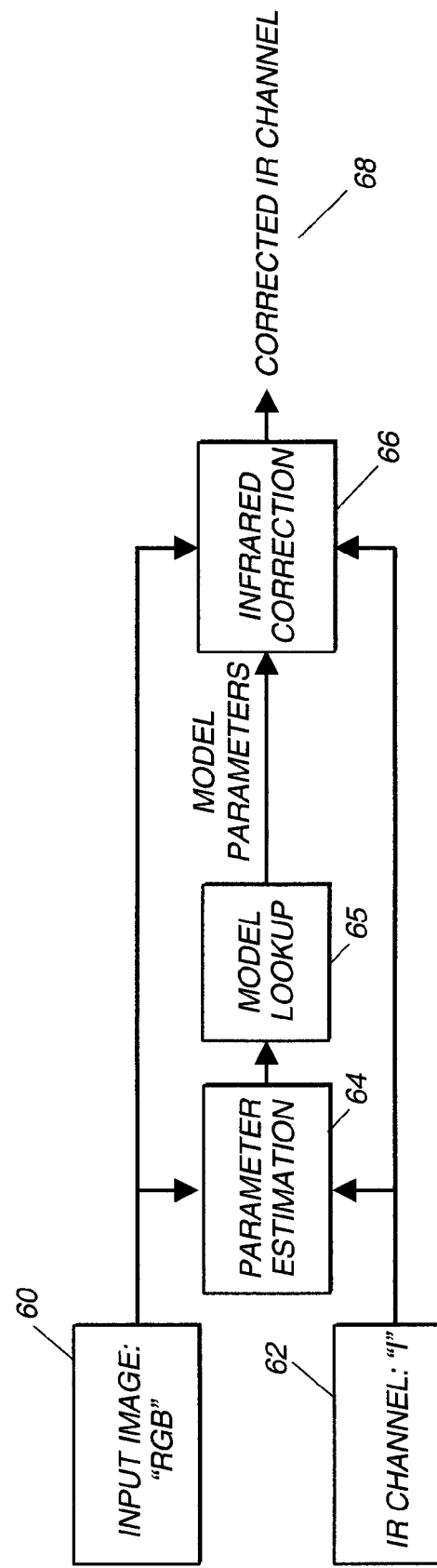
FIG. 6 shows a block diagram of a general arrangement for an embodiment of the present invention, which operates on an image sequence by first estimating the model parameters from the infrared and visible color records which are used to select a closest match in a library of parameters for known media; then the best matching model parameters are used to produce a corrected infrared channel using those estimated parameters.

FIG. 6 shows a block diagram of another embodiment of the present invention. Images from a film scanner enabled with an infrared light source provide RGB image data 60 as well as an infrared channel 62. Here, the model parameters are estimated 64 from the scanned data directly and are compared to a known library 65 of models. The closest matching model parameters are selected and used to correct 66 the infrared channel and provide a corrected infrared channel 68.

The invention has been described with reference to a preferred embodiment. However, it will be appreciated that variations and modifications can be effected by a person of ordinary skill in the art without departing from the scope of the invention.

PARTS LIST 10 common defects
11 desired infrared channel
12 measured infrared channel
40 RGB image data
42 infrared channel
44 infrared correction
46 corrected infrared channel
48 film stock model
50 RGB image data
52 infrared channel
54 parameter estimation
56 infrared correction
58 corrected infrared channel
60 RGB image data
62 infrared channel
64 parameter estimation
65 model lookup
66 infrared correction
68 corrected infrared channel

The invention claimed is:

1. A method for correcting defects in one or more frames of motion picture film, the method comprising the steps of:
   (a) generating an image that includes an infrared channel and one or more color channels;
   (b) providing an infrared unbuilding model that includes at least one linear term and at least one non-linear term that accounts for cross-talk between the one or more color channels and the infrared channel, wherein at least one of the non-linear terms includes a square of one of the color channels or the product of two of the color channels, the infrared unbuilding model having the form:

$$I_{ideal} = I_{measured} + L_R \times R + L_{R2} \times R^2 + L_{RG} \times R \times G + L_{RB} \times R \times B + L_G \times G + L_{G2} \times G^2 + L_{GB} \times G \times B + L_B \times B + L_{B2} \times B^2$$

where R, G and B are measured values for the red, green and blue color channels, respectively, $I_{measured}$ is a measured value for the infrared channel, $L_R$, $L_G$, and $L_B$ are model parameters for the linear terms, and $L_{R2}$, $L_{G2}$, $L_{B2}$, $L_{RG}$, $L_{RB}$ and $L_{GB}$ are model parameters for the non-linear terms, wherein at least one of the model parameters for the linear terms is non-zero and at least one of the model parameters for the non-linear terms is non-zero;

(c) providing one or more parameters for the infrared unbuilding model; and (d) applying the infrared unbuilding model parameters to the infrared unbuilding model to remove cross-talk between the one or more color channels and the infrared channel to generate an independent infrared channel that is free or substantially free of color channel content.

2. The method as in claim 1, wherein the step (c) further comprises analyzing the one or more color channels and the infrared channel to estimate the model parameters of the infrared unbuilding model.

3. The method as in claim 1, wherein step (b) further comprises providing a lookup table as corresponding to the infrared unbuilding model.

4. The method as in claim 2, wherein step (c) further comprises using regression to determine the parameters for the infrared unbuilding model.

5. The method as in claim 1, wherein the step (c) further comprises using a predetermined set of parameters for the infrared unbuilding model for a particular film stock.

6. The method as in claim 1, wherein step (c) further comprises:
   (i) estimating the model parameters for the infrared unbuilding model from the one or more color channels and the infrared channel;
   (ii) comparing the estimated model parameters to model parameters for a library of infrared unbuilding models corresponding to known film stocks; and
   (iii) using at least one set of model parameters from the library of infrared unbuilding models as a set of final model parameters for the infrared unbuilding model.

7. The method as in claim 2, wherein step (c) further comprises using an iterative estimation process to determine the model parameters in which at least one pixel from the one or more color channels is excluded in a subsequent iteration.

* * * * *

UNITED STATES PATENT AND TRADEMARK OFFICE
CERTIFICATE OF CORRECTION

| | |
|---|---|
| PATENT NO. | : 8,159,555 B2 |
| APPLICATION NO. | : 11/854609 |
| DATED | : April 17, 2012 |
| INVENTOR(S) | : Gabriel Fielding |

It is certified that error appears in the above-identified patent and that said Letters Patent is hereby corrected as shown below:

| Issued Patent | | Description of Error |
|---|---|---|
| Column | Line | |
| 5 | 14 | In claim 3, after "table" delete "as" |

Signed and Sealed this
Second Day of October, 2012

David J. Kappos
*Director of the United States Patent and Trademark Office*